Jan. 2, 1968  K. C. RIPLEY  3,361,103
WATER CRAFT
Filed Dec. 14, 1965  8 Sheets-Sheet 1

INVENTOR
Kenneth C. Ripley
BY
Stevens, Davis, Miller & Mosher
ATTORNEYS

Jan. 2, 1968 K. C. RIPLEY 3,361,103
WATER CRAFT
Filed Dec. 14, 1965 8 Sheets-Sheet 6

INVENTOR
Kenneth C. Ripley

BY Stevens, Davis Miller & Mosher
ATTORNEYS

United States Patent Office 3,361,103
Patented Jan. 2, 1968

3,361,103
WATER CRAFT
Kenneth Clay Ripley, 3058 Harrison St. NW.,
Washington, D.C. 20015
Filed Dec. 14, 1965, Ser. No. 513,731
27 Claims. (Cl. 114—66.5)

ABSTRACT OF THE DISCLOSURE

A water-going craft having a hull riding above the water line and provided with lift-producing wingless struts each capable of developing positive lifting pressure beneath the lower end as it rides completely below the water line at a forward velocity greater than the take-off speed. One strut design is solid and includes a positively cambered base. Another design comprises a strut defining a pressure channel opening to the water ambient and through which a pump feeds high pressure liquid which exhausts at low velocity by virtue of the static pressure head at the base openings. All struts are streamlined and can be arranged in assemblies with a plurality of small fins or foils providing lifting forces to damp heave, roll and pitch.

---

The present invention relates to a water craft, and more particularly, to a radically new and improved lift-producing strut design for such craft. The struts of the present invention operate on a completely different principle than the conventional wing-type foils now used in the art. The newly designed struts of the present invention make possible a craft capable of traveling at high speed over great distances and enable the craft to operate in open seas, as well as sheltered waters.

Conventional hydrofoils include aerodynamic wing-type lifting surfaces which are either completely submerged or surface piercing during operation. If the conventional craft is for commercial use, it is uneconomical to have the craft designed for speeds much in excess of 40 knots. Also, maximum speed of the craft is limited by cavitation characteristics of these foils. Such a craft cannot operate in rough seas and is restricted to use in sheltered waters. Although these wings can be swept back, cambered, surface piercing and the like, the design thereof and the speed of the craft are necessarily limited by the cavitation characteristics of the medium. It is well known in the art that these wings, when of conventional section, operate in subcavitation modes in order to avoid sudden losses of lift and erratic vertical forces.

The above-mentioned upper limit of 40 knots does not take into account super-cavitating foils now known in the art, but the power consumption of super-cavitating foil crafts severely limits, or prohibits, their use for commercial or private purposes.

The subcavitating foil does not lend itself to super-cavitating use because such use would result in violent and uncontrollable fluctuations of lift in coming up to full cavitation on the upper lifting surface. Power requirements would prohibit such a use of the subcavitating foil. Thus, in order to cavitation limit the design of a subcavitating foil, the coefficient of lift must be held to a modest value, for example, about 0.30 for a conventional craft at 40 knots. It then follows that, in order to avoid cavitation, the effective angle of attack may not exceed about 2.9°, but the geometrical angle of attack must, therefore, be greater than 2.9° for a craft to be suitable for operation in waves if the foil is to be surface piercing. If the aspect ratio of such a foil is set at the generally recommended value of 2.5, the induced angle of attack is 2.2° and the geometrical angle of attack is 5.1°. This value of the geometrical angle of attack is marginal for successful operation in sheltered waters, and, furthermore, it is too small to allow the craft to operate in uneven and rough seas.

Another problem with the wing-type hydrofoil is the excessive drag forces imparted to the system which result in a waste of power. The basic theory for hydrofoil craft is to raise the entire hull of the craft out of the water to reduce the great amounts of wetted hull surface so that friction-opposing forward motion is greatly reduced. The power required to keep the hull out of the water must be less than the over-all power developed by the propulsion system so that speed of the craft is accelerated in coming up to speed. However, with the present wing-type foils, there exists relatively great drag due to large wave-making resistance at reduced speeds, induced drag at all speeds, spray drag, and drag resulting from the large wetted area of the foils which are in contact with the medium. These drag forces are especially troublesome while the craft is becoming foil borne.

Another problem of the winged hydrofoil craft is that it cannot operate in unsheltered waters, that is, it cannot operate on the open seas. This fact is well known in the art and it results from the large surfaces presented by the wings which are greatly affected by wave energy normally found on the open seas.

A serious problem of the winged hydrofoil craft when operating in the open seas is that in long following seas there is a tendency for the wings to lose all lift capabilities due to the geometric angle of attack which a following wave imparts to the wing even if the craft is operating at approximately 40 knots. This will cause prolonged acceleration and possibly a pitch of sufficient degree to cause the craft to plunge into the water.

For these reasons, conventional hydrofoil craft cannot and do not operate on the high seas far from the continental shelf.

Yet another problem in the present winged hydrofoil art is that the lift developed varies as the square of the craft's speed, all other conditions being the same. Since the craft has an upper speed limit due to subcavitation requirements, it can be understood that it also has a lower speed limit due to the lift requirements for the craft. Hence, if the speed of the craft reduces below this limit, the hull then rides back into the water because of insufficient lift.

From this perspective of some of the limitations of the present wing-type hydrofoils, it can be seen that there is a demand for a radically different design of hydrofoil so that hydrofoil craft can operate on the open seas, operate at greater efficiencies, and have ranges for transoceanic travel. The present invention meets this requirement and provides a radically new design of hydrofoil craft. The present invention sets forth a design which is particularly adapted for use in a water medium and is not a mere transformation of an aerodynamic element used in a water medium.

Generally described, the present invention, in a first embodiment, provides a craft which is supported above the surface of a body of water by the use of lift-producing struts which are in the form of streamlined solid struts which have a bottom extending below the surface of the body of water. This first embodiment has a cambered surface at the base thereof so that positive pressure and a lifting force are produced thereby when the struts are in motion above a certain speed. Steering the craft is effected by the struts themselves or a conventional rudder. In this first embodiment, lift developed by the struts varies nearly with the square of the speed of the craft unless the angle of attack is adjusted to maintain lift constant.

The second embodiment of the present invention comprises a similar craft supported by a plurality of struts extending below the water surface. These struts are hollow throughout their length and communicate with a pumping and reservoir system within the craft. After a given velocity is reached, the pumping system pumps water from the seaway under great pressure through each of the hollow struts so that high pressure is developed at the base and a large lift is produced thereby. In this second embodiment, the propulsion system comprises, as one option, the same pumping means which keeps the craft "foil borne." The steering mechanism for the craft can also comprise the strut system of the craft, or, alternately, a conventional rudder. The lift developed by the pressurized struts is independent of speed as long as the craft is "foil borne."

In both the aforementioned embodiments, a double strut (pair) arrangement may be provided with a plurality of small fins connected therebetween. The use of pairs of struts is good for structural reasons, and the space therebetween offers protection and secure fastening for the small fins. These fins have a dual function. The fins develop lift for each strut assembly in an amount that depends upon the degree of submergence of the struts below the actual water level. The fins also damp vertical movement of the strut assembly when the craft is heaving, rolling or pitching. It is estimated that the fins should develop about 10 or 20 percent of the total lift in order to provide a good value of spring constant in heave and damping coefficient.

It is a primary object of the present invention to provide a hydrofoil design that has a lift-drag ratio which is much greater than that developed by wing-type conventional hydrofoils.

It is another primary object of the present invention to provide a hydrofoil craft, the primary lift of which is developed by a region of positive hydrodynamic pressure under each strut. Each strut is streamlined and extends from the hull of the craft into and below the surface of the body of water in which the craft is moving. The new struts are not cavitation limited, and because of this, they can be designed to utilize surprisingly large unit loadings of plan form area. The small wetted area of the struts (as compared with what would be needed for a conventional design of hydrofoil) gives a larger value for lift-drag ratio, and this ratio is further increased when account is taken of the elimination of induced drag that the pressurized strut provides, namely, the elimination of trailing-vortex flow, as distinguished from wave-making flow.

It is another object of the present invention to provide for a craft, a strut which develops its lift (approximately 80 to 90 percent of the total lift) independent of the speed of the craft, for the speed range in which the craft is "foil borne."

Another object of the present invention is to provide a strut that as regards the contribution to lift by the pressurized struts, as distinguished from the fins, is not dependent on angle of attack of camber for development of lift, and so as regards the possibility of imparting vertical acceleration to the craft is quite insensitive to cutting through waves in any seaway.

A still further object of the present invention is to provide for a craft, a lifting strut which in operation has little or no trailing vortex-flow, and so will have negligible or zero drag due to such flow.

It is yet another object of the present invention to provide for a craft, a lifting strut which has a component of lift in the vertical direction practically independent of the pitch of the craft. In the case of the present invention, the lift developed by the pressurized struts is independent of the pitch of the craft, and so the resolution of lift into the vertical direction consists of applying the cosine of the angle of pitch, a quantity which will be nearly unity. In the case of conventional, wing hydrofoils, any pitch of the craft changes the angle of attack of the foils and so can alter radically the lift being developed by the foils. As an example, consider a conventional, wing hydrofoil that has a geometrical angle of attack, including camber, of 5° when the hydrofoil is developing its design value of lift necessary to support the craft; if the instantaneous pitch of the craft relative to the flow past the craft is such that the pitch subtracts 5° from the geometrical angle of attack of the foils, the instantaneous value of lift being developed to support the craft will vanish.

It is another object of the present invention to provide for a craft, a lifting strut which is structurally simple, inexpensive to make, and easy to extend and to retract.

It is yet another object of the present invention to provide for a craft, a lifting strut system which will provide a transport efficiency which is unattainable with presently known systems. Transport efficiency is the quotient obtained by dividing the product of weight of hull in tons and craft speed in knots, by actual shaft horsepower.

It is still a further object of the present invention to provide for a craft, a lifting strut system which is cavitation free, independent of any maneuvers of the craft, and independent of any motion of the craft due to waves.

It is yet a further object of the present invention to provide for a craft, a lifting strut system which is adapted to act also as the propulsion system and steering mechanism for the craft.

Other and further objects of the present invention will become apparent with the following detailed description in view of the attached drawings in which:

FIG. 1b is a sectional top plan taken along line 1b—1b of FIG. 1a;

FIG. 1c is a partial side elevation of the base of the structure in FIG. 1a;

FIG. 2 is a side elevation of a hydrofoil craft which comprises the struts of FIG. 1;

It should be understood that the examples of conventional craft and craft in accordance with the present invention referred to hereinbelow are in reference to one size of boat, a 3.5 ton, 27-foot craft. Also, like character reference refer to like structure throughout the figures.

Referring now to FIGS. 1a, 1b, 1c and 2, there is illustrated a solid, lift-producing strut 10 in accordance with the present invention. The upper end of strut 10 is mounted to craft 12 in a manner more fully described below. As better seen in FIG. 1c, the base 12 of strut 10 is cambered, and all of the required lift is developed by each strut at base 12 when it is given a predetermined velocity by the craft's propulsion system 14. In the presently illustrated example, strut 10 has a constant longitudinal dimension and a constant value of thickness-chord ratio of about one-eighth (one inch to eight inches). As better seen in FIG. 1b, strut 10 is streamlined so that it can better cut through water at high speed without cavitation.

Base 12 of the strut is the primary surface used to develop lift, and its positive camber insures that only positive pressure will be developed. Thus, the lift developing surface of this invention is not cavitation limited, and, if necessary, a large value of camber may be used. The only limitation on the camber of base 12 is that the flow over the cambered base must not be destroyed by stall.

Figure 1A:
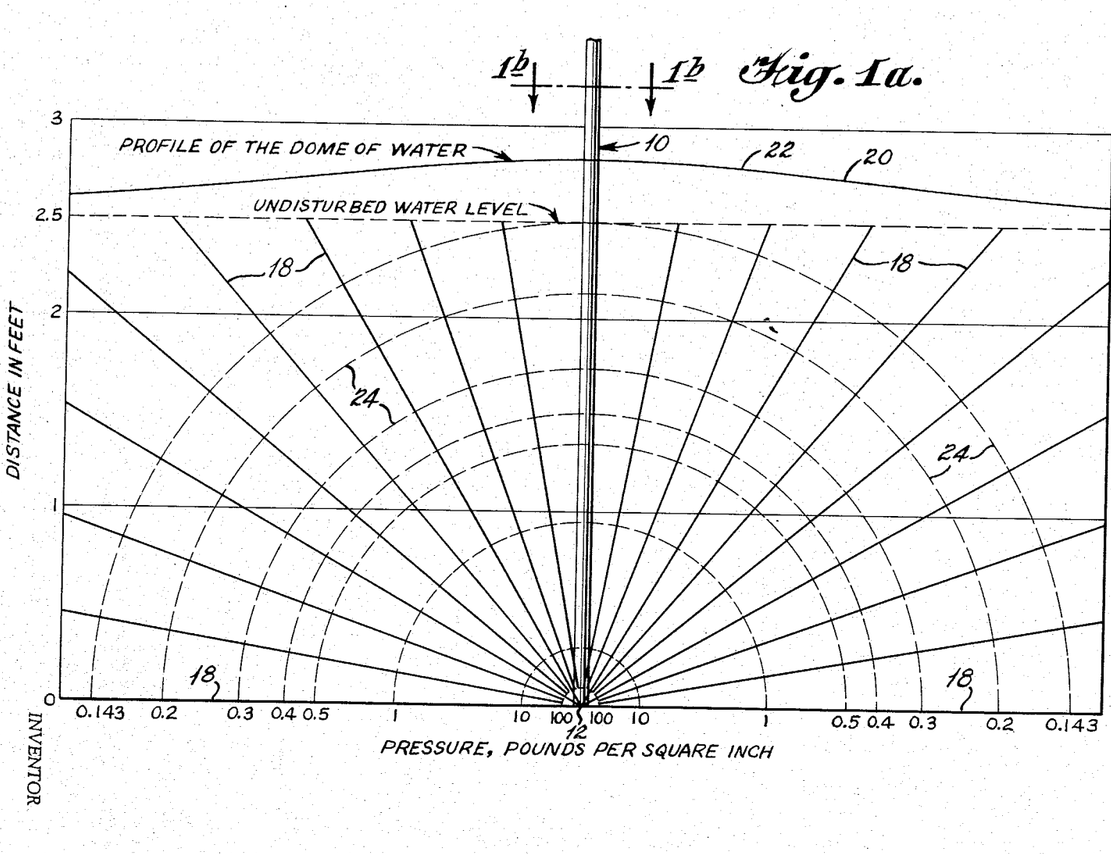
FIG. 1a is a front elevation of the lower part of a strut in accordance with the present invention, and there is schematically shown in this figure the pressure distribution created by the illustrated strut as it moves through the water at the predetermined speed.

In FIG. 1a, the undisturbed water line would be the medium profile in the absence of the forward moving strut 10. However, the positive pressure produced at the cambered base 12 of moving strut 10 produces radial streamlines 18. Streamlines 18 extend to the free surface 20, and in doing so, they contribute to the formation of a dome of water 22 which has a velocity translation the same as the velocity of the strut 10. Streamlines 18 extend in all radial directions of a hemisphere, and therefore dome 22 extends over the entire water surface, that is, theoretically, to infinity in all directions if the body of water is treated as though without limit. Dotted lines 24 are equipotential lines and are concentric with the assumed point source of positive pressure. It is apparent that the pressure directly under base 12 of strut 10 is quite high and the pressure drops off rapidly as the distance from base 12 increases. Moreover, the positive pressure under camber base 12 is omni-directional and pushes against strut 10 and the large mass of water lying above horizontal streamlines 18. It is required, theoretically, that during steady state operation, the weight of the dome of water is exactly equal in magnitude and opposite in sign to the lift being developed by strut 10. It should be remembered that the streamlines and pressure distribution are schematically represented in FIG. 1a, and it is assumed that the positive pressure source caused by base 12 exists at a point at the center of said base.

In addition to the lifting force, a drag is imparted to strut 10. That portion of the energy supplied by the craft's propulsion system which overcomes drag also maintains flow to the water surface so that the dome 22 is maintained and equilibrium is satisfied. This flow to the water surface is equal to the flow that is withdrawn from the water surface during steady state operation, and in this way a continuous supply of energy is required to balance a continuous drain of energy due to wave making. Wave making is a continual drain on the dome of water because of the wake being shed as energy in the form of waves. Thus, wave making in effect is an induced drag, which signifies that there is an induced angle of attack on strut 10. This induced angle of attack is consistent with the fact that the normal force developed by the strut is the vector sum of the lift, which is a vertical force, and the wave-making drag, which is a horizontal force.

At 40 knots, the wave-making resistance of strut 10 is so small that the induced angle of attack due to wave making can be treated as insignificant, and therefore, practically all of the geometric angle of attack of the foil will be the effective angle of attack. The foil of the present invention produces no trailing-vortex flow.

As previously stated, the practical value of the co-efficient of lift for subcavitating foils which operate at a maximum speed of about 40 knots is 0.30. It is apparent that the lifting struts 10 of the present invention could quite safely have a coefficient of about 0.60. The required cambered base 12 which develops this particular coefficient of lift is 0.60/0.104, which is a camber of 5.770°. It is well known that the angle made with the horizontal by the camber line at either end of base 12 is twice the camber, and therefore, this angle in this example is 11.54°.

The dynamic pressure of seawater at 40 knots is 4,548 pounds per square foot, and the coefficient of 0.60 for lifting strut 10 results in a positive pressure of 2,729 pounds per square foot over the base 12 of foil 10. This pressure is equal to that from a head of seawater of 42.6 feet. Thus, mathematical calculations show that sufficient lifting force is developed by strut 10 to lift and maintain the craft above the water level.

Figures 1B, 1C, 2:
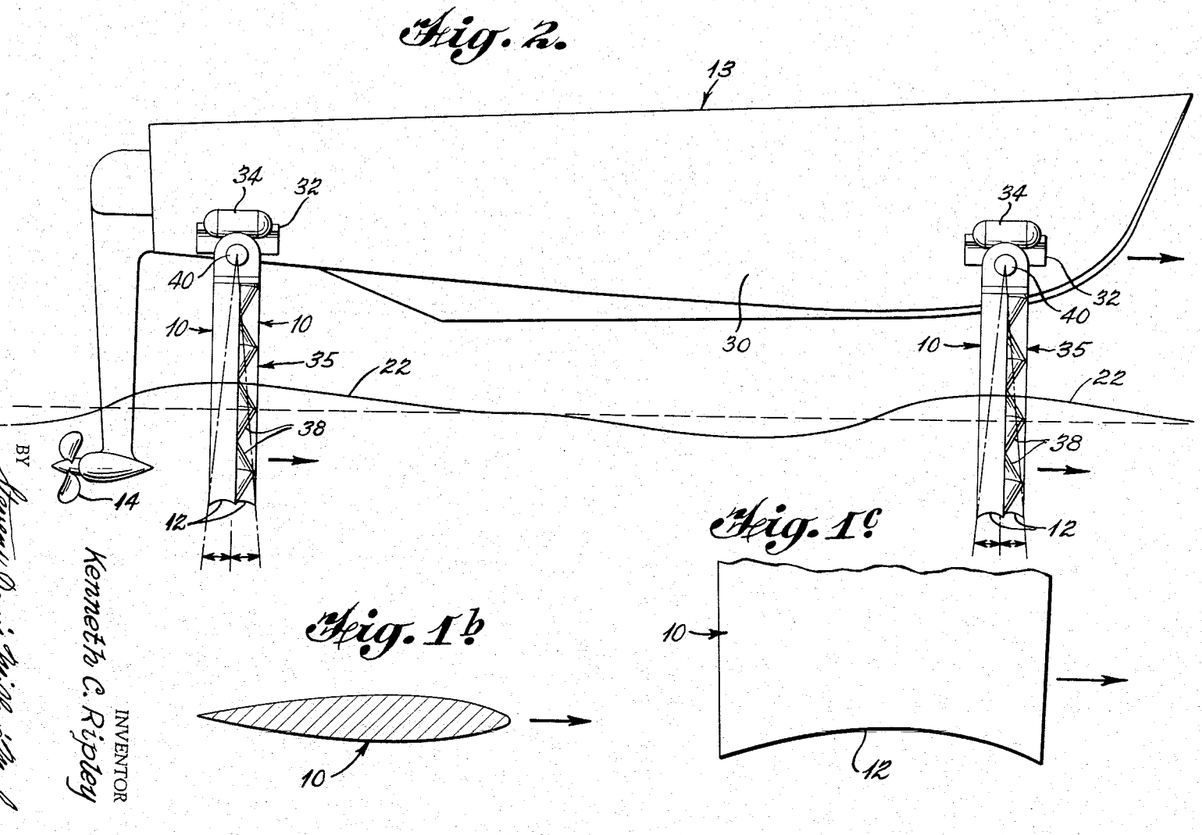
Figures 3, 16:
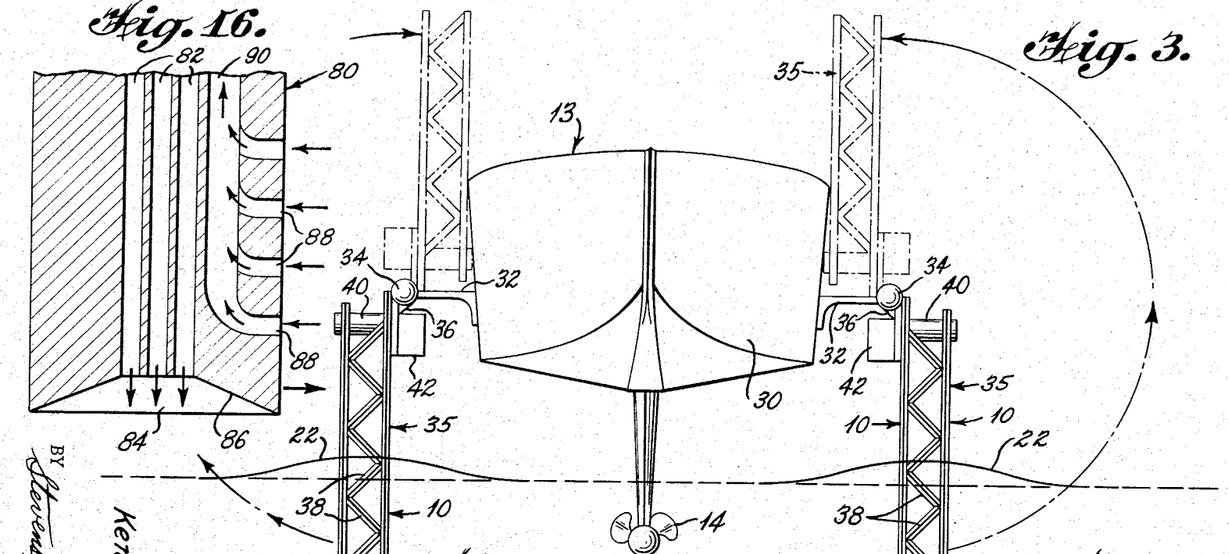
FIG. 3 is a front elevation of the craft shown in FIG. 2.
FIG. 16 is a longitudinal vertical sectional view of the base portion of yet another embodiment of the foil of the present invention.

Craft 13 shown in FIGS. 2 and 3 has a hull 30 provided with four brackets 32 each of which supports a rotatable hinge 34 which, in turn, is connected to the upper end of one of the foils 10 of strut assembly 35. Connected to the underside of each bracket 32 is a depending stop member 36 which provides a rotation limit for strut assembly 35 and maintains the same in a vertical position when the craft is "foil borne." When the struts 10 are not in use, strut assembly 35 can be rotated by any suitable means (not shown) to the vertical position shown by dashed lines in FIG. 3.

The strut assembly 35 comprises inboard and outboard struts 10, and, as better seen in FIGS. 10–13, the inboard strut is slightly ahead of the outboard strut. A plurality of small, cambered fins 38 are rigidly secured between the inboard and outboard struts 10, each at a 45° angle with the vertical, and each with its upper and lower end meeting the upper and lower end of adjacent fins at their junctions with respective struts 10. The chord of each fin 38 is substantially equal to the chord of struts 10 so that each fin 38 has a slight angle of sweep.

Each fin 38 provides lift when it is submerged. The total lift developed by all fins is proportional to the amount of fin surface below the actual water level. Thus, fins 38 provide static stability against displacement in roll, pitch and heave of the craft 12, and, at the same time, fins 38 develop a damping moment or damping force for roll, pitch or heave.

It is anticipated for the craft of the present invention operating at 40 knots that fins 38 need only develop about 10 to 20 percent of the total lift in order to insure adequate operational stability for roll, pitch or heave. Thus, fins 38 do not hamper operation in open seas because even if at any one instant the total lift developed by fins 38 were removed, the craft would still remain "foil borne" due to the primary lift developed by struts 10.

Fins 38 are mounted at approximately 45° with the horizontal to afford optimum structural advantages and are swept back at approximately 30° for the purpose of shedding any obstacles encountered in the water. However, it should be understood that fins 38 could be mounted horizontally or in any other configuration without departing from the present invention.

Struts 10 also serve as end plates for fins 38 and, thus, insure that the flow over the fins will be essentially two-dimensional, that is, without trailing or wing-tip vortices anywhere over the span. For this reason, it is preferred that the chord of each fin 38 be constant over its span. In the absence of trailing vortices, fins 38 only produce induced drag which results from the wave-making resistance of fins 38, and therefore, the total drag created by the fins 38 and struts 10 is relatively small when compared to drags produced by conventional craft.

As is better seen in FIG. 2, each strut assembly 35 has its upper end secured to a rotatable shaft 40 which extends through the stop member 36 into a motor housing 42 located on the inboard side of inboard strut 10. Any suitable motor (not shown) within housing 42 controllably rotates shaft 40 and strut assembly 35 in the vertical longitudinal plane so that cambered base 12 of each strut 10 can assume different angles of attack depending upon the predetermined angular position of shaft 40. As the speed of craft 13 increases, the angle of attack of base 12 can be decreased in order to maintain the lift developed by strut 10 at some predetermined constant.

In operation, when the craft is operating in shallow water or at slow speed, strut assemblies 35 are retracted to the position shown in phantom lines in FIG. 3, and the craft operates as a normal displacement craft.

Strut assemblies 35 are rotated to the downward position, and the forward speed of the craft is increased. Strut asssemblies 35 are rotated so that bases 12 of struts 10 assume the maximum angle of attack, and so that craft 13 becomes "foil borne" at a speed reasonably below the maximum speed of the craft. With strut assemblies 35 at the maximum angle of attack, craft 13 reaches and passes through the takeoff speed without stall of fins 38. When struts 10 develop sufficient lift, hull 30 is lifted above the water. Once craft 13 is well above takeoff speed, strut assemblies 35 are rotated to reduce the angle of attack of cambered base 12. When craft 13 reaches its operational speed, a constant or steady state dynamic condition exists. Roll, pitch and heaving motions of craft 13 are dampened by fins 38 as described above. Steering is accomplished by any suitable means such as a conventional rudder (not shown).

Figure 4:
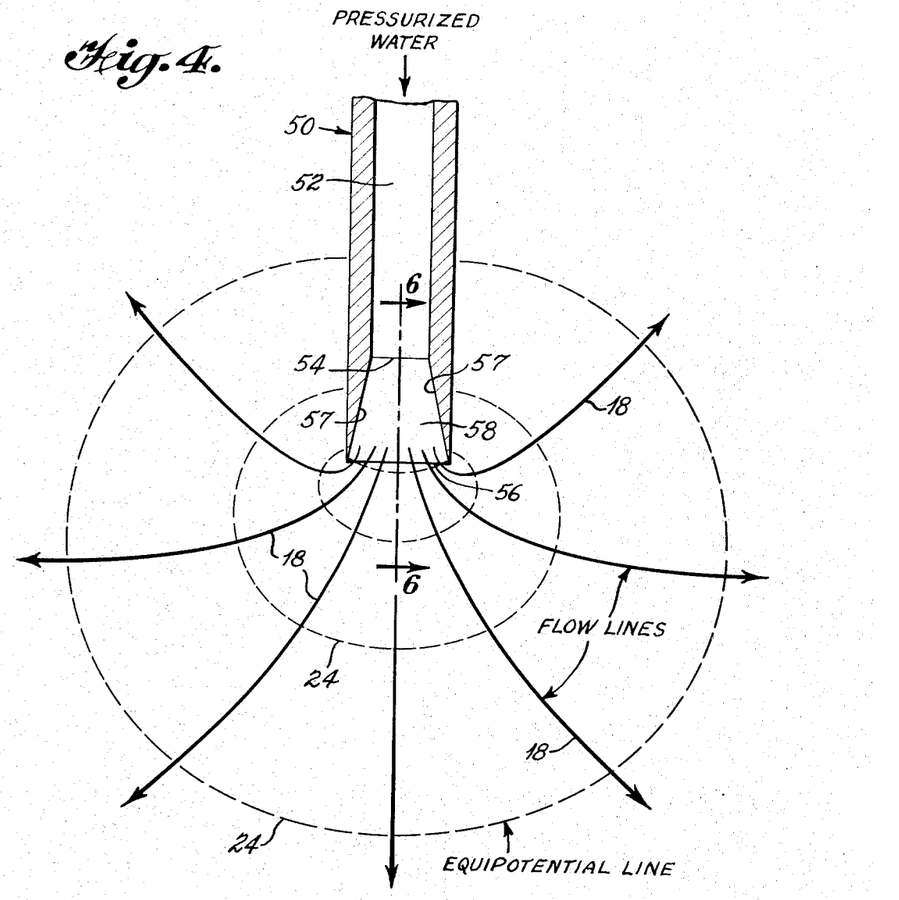
FIG. 4 is a vertical transverse sectional view of the base of another strut in accordance with the present invention. Also illustrated in this figure is the local pressure distribution about the base of the strut created thereby.
Figure 5:
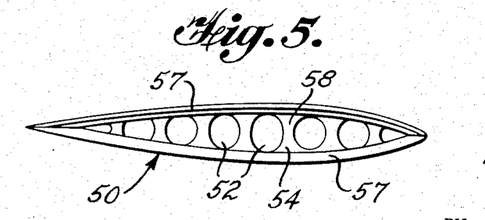
FIG. 5 is a bottom plan view of the strut of FIG. 4.
Figure 6:
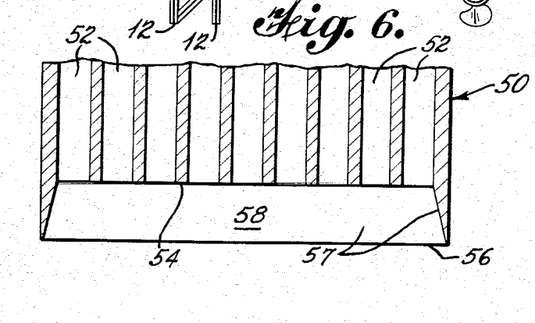
FIG. 6 is a vertical longitudinal sectional view of the base portion of the strut of FIG. 4.

A second embodiment of the present invention is shown in FIGS. 4–6 and comprises a streamlined strut 50 that has a constant chord dimension and a constant thickness-to-chord ratio of about one-eighth (one inch to eight inches). The constant chord dimension is preferred to keep the frictional resistance of the struts to a minimum, but, if desired, this chord dimension need not be constant. Strut 50 defines a number of hollow conduits 52 which extend vertically throughout its length and terminate at inner horizontal surface 54. Inner walls 57 flare slightly from surface 54 to bottom 56 of strut 50 and define chamber 58 which communicates with all conduits 52 and the ambient through the bottom opening of strut 50. The upper ends of conduits 52 with use of any suitable means (not shown) communicate with a source of pressurized water as further described below. For the craft of the present example, water is maintained at a pressure of approximately 316 pounds per square inch at the opening at bottom 56, and this pressure causes a streamlined end pressure distribution pattern substantially as shown in FIG. 1b. However, it should be understood that the streamlined end pressure distribution illustrated in FIG. 4 is for local distribution in the immediate area of base 56.

The choice of 316 pounds per square inch as the pressure at bottom 56 is arbitrary and has been set in this example so that the coefficient of lift developed by struts 50 is 10. At 40 knots, the dynamic pressure of seawater is 4,548 pounds per square foot which is equal to 31.6 pounds per square inch. It is important to note that the maximum pressure on the underside of strut 10 as described above (FIGS. 1–3) cannot exceed the stagnation pressure of the free stream. But the maximum pressure of pressurized struts such as that shown in FIG. 4 at the underside of the strut 50 can be in excess of the stagnation pressure of the free stream by any desired amount.

The pressure of 316 pounds per square inch is maintained constant regardless of the speed of the craft, and if the craft of the present example travelled at 20 knots, the coefficient of lift developed by the struts 50 would be approximately 40.

Since the large mass of liquid affected by streamlines 18 has substantially a zero velocity when strut 50 is moving at operational speed, pressure at bottom 56 is applied against an enormous mass of liquid, and, conversely, the enormous inertia forces of the liquid-opposed force from this high pressure. In this manner, a large lift is developed within the liquid in conduit 52 and is applied to strut 50.

Although there is great pressure exerted on the liquid from the top of conduit 52, the amount of liquid exhausting to the bottom 56 of strut 50 is substantially small because of the great inertial forces (mass) of the surrounding ambient.

Calculations show that the pressurized strut 50 has a low downwash velocity at the lifting line and a low wave-making resistance value.

Figures 14, 15:
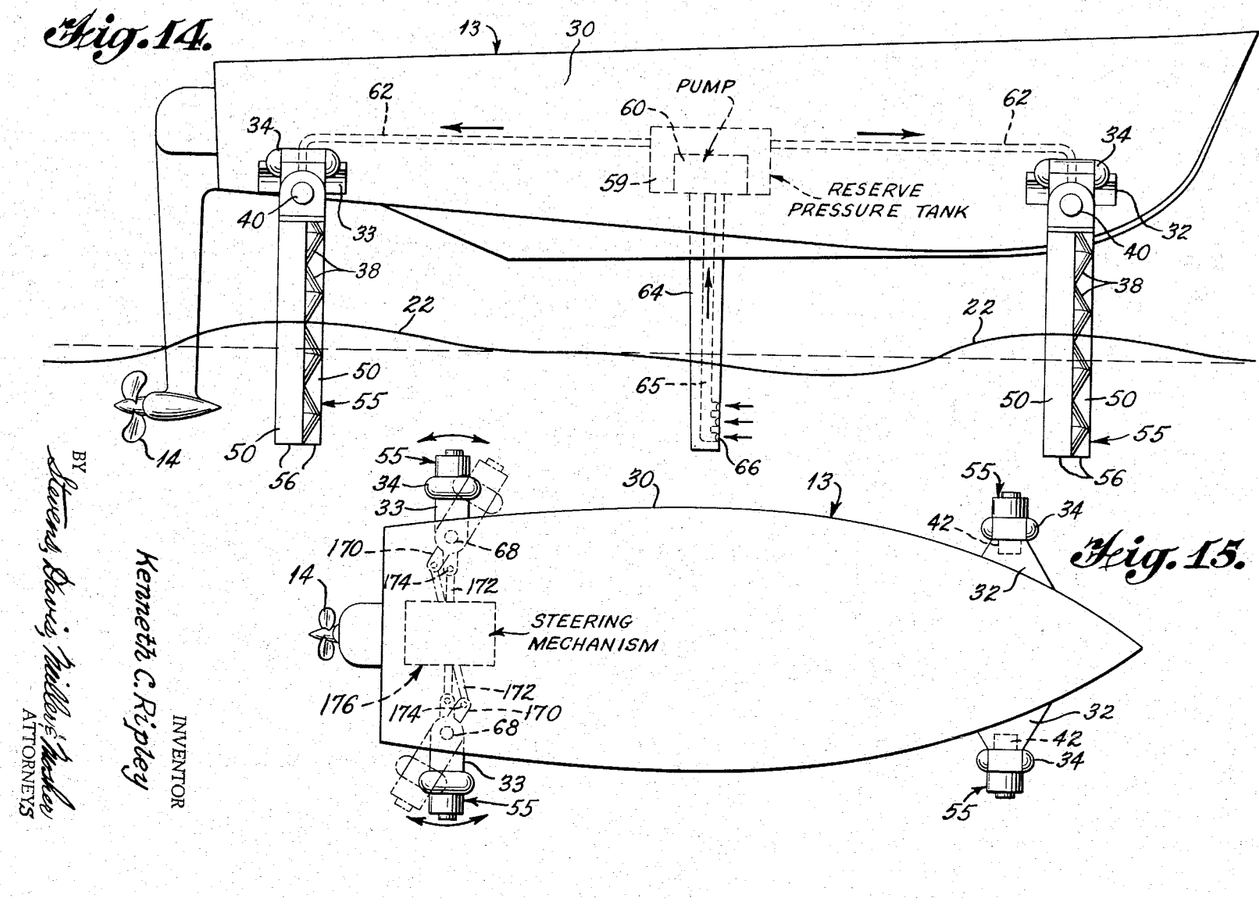
FIG. 14 is a side view of a craft including pressurized struts in accordance with the present invention.
FIG. 15 is a schematic plan view of the craft showing an example of a steering mechanism.

Referring to FIGS. 14 and 15, strut assemblies 55, which include pressurized struts 50, are rotatably mounted to bracket 32 by means of hinge member 34. A pump or liquid compressor 60 feeding reserve tank 59 is provided on shipboard, and high pressure hydraulic lines 62 communicate by any suitable means with the reservoir outlet and the upper ends of conduits 52. A streamlined liquid intake shaft 64 extends below the liquid surface, and water enters the openings 66 at the bottom of shaft 64, flows upward through supply channel 65 into pump 60. It has been determined by mathematical calculation that the volume of liquid exhausted from strut 50 for the craft of the present invention operating at 40 knots is roughly 181 gallons per minute, inclusive of all losses including wave-making resistance. Pump 60, which delivers high-pressure liquid to strut assemblies 55, can be a reciprocating pump working at fairly low speeds, and therefore, it can have an efficiency up to about 90 percent. See, for example, page 688, Hydraulics and Its Applications, by A. H. Gibson, 5th Edition, Constable & Co., Ltd., London, 1952. Conventional positive rotary pumps of the drum type are known to deliver 700 gallons per minute and can also be used for pump 60.

Figure 17:
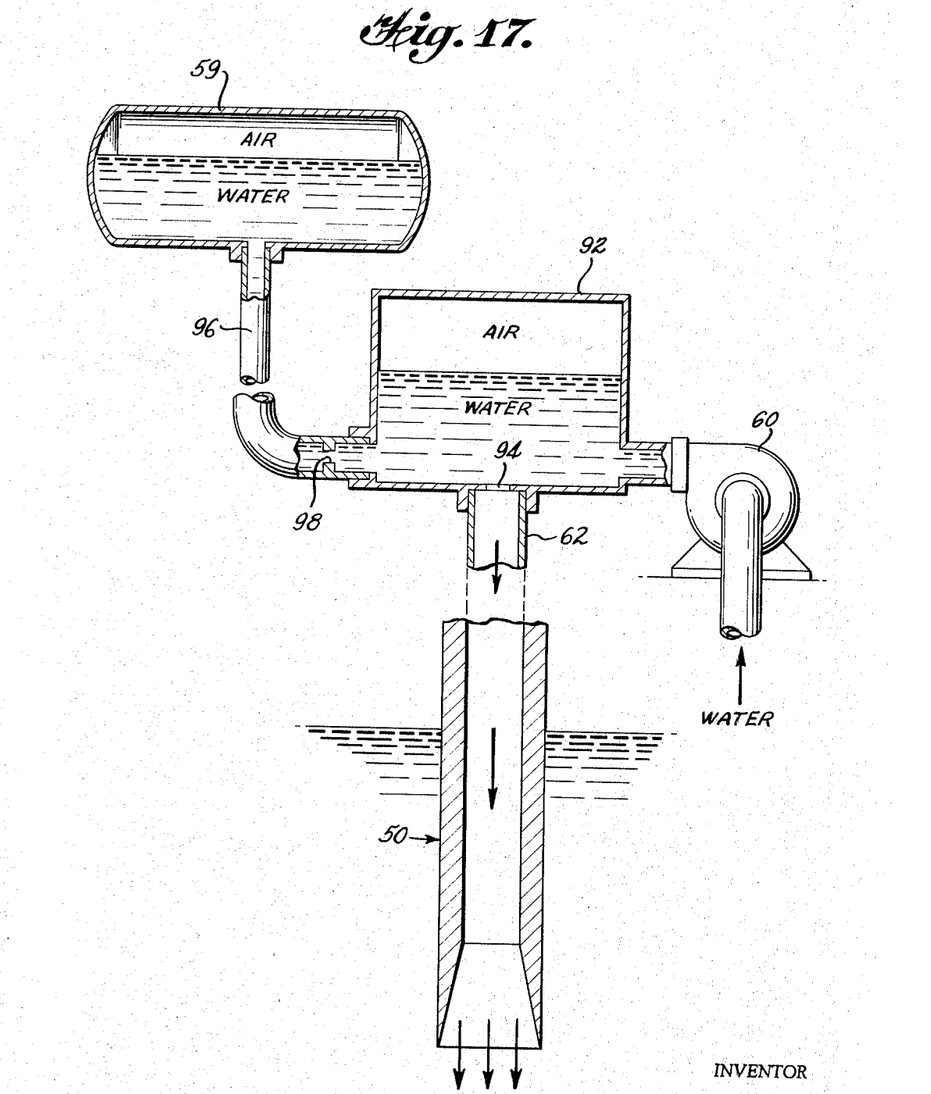
FIG. 17 is a diagrammatic illustration of the pump and reservoir system feeding the struts of the present invention.

One example of the pump and reserve tank system for use with the present invention is diagrammatically shown in FIG. 17. Pump 60 draws water from the sea in the manner described and feeds the same under high pressure to a liquid-tight casing 92 which has a volume capacity of approximately one gallon. A reserve tank 59, having a volume of approximately 15 gallons, is provided on shipboard and communicates with the bottom of casing 92 via pipe 96. Conduit 62 is fluid coupled between another opening in casing 92 and the liquid exhaust channels of each strut 50.

The opening between conduit 62 and casing 92 is in the form of a restricted nozzle due to the provision of restriction 94. Another restriction 98 defines a nozzle-like opening within conduit 96 between tank 59 and casing 62. The function of nozzles 94 and 98 is described below.

When pump 60 is energized, water is taken from the sea and fed under pressure to casing 92 and into reserve tank 59. The air spaces above the water mass in each container provide some degree of damping so that rapid increases in water pressure do not rupture the walls of the containers. As long as there is substantial back pressure at the base of foil 50 due to the large ambient mass of liquid encountered as the craft moves forward, there will be relative low velocity flow through restriction 94 into conduit 62. However, in the unlikely event that the base of strut 50 approaches the surface of the ambient or is for some reason instantaneously uncovered, restrictions 94 and 98 prevent a high velocity surge of water from casing 92 and reserve tank 59. In this way, a sharp reduction in pressure in casing 92 and strut 50 is avoided and the only consequence is the instantaneous loss of lift which enables the base of strut 50 to quickly lower to the operational level. It is apparent that the reserve tank 59 water supply and pressure serves to maintain the water casing 92 at a sufficient operating level and aids to compensate for a slight variation in delivery rates.

Forward brackets 32 are rigidly mounted to the hull 30. But the rear brackets 33 have their inboard ends pivotably mounted about a vertical axle 68 so that bracket 33 and the strut assembly 55 connected thereto are rotatable in the horizontal plane. Integral with the rear of bracket 33 is an extending finger 170 rotatably connected to operating bar 172 by pin 174. The angular position of bar 172 is controlled by steering mechanism 176. Steering mechanism 176 moves the starboard and port connecting bars 172 in opposite forward and rear directions.

When craft 13 is foil borne and moving with a forward velocity, steering is accomplished by rotation of the rear strut assemblies 55 so that the changed angle of incidence thereof causes a coming around of the stern of craft 13. With this stern-located steering control, the craft heels into a turn. If desired, the forward strut assemblies may also be arranged to effect steering of the craft.

When craft 13 is hull borne, any conventional thrust producing means such as a conventional propeller 14 is used to propel the craft. However, when the craft is foil borne, the pressurized strut 50 of the present invention can produce its own thrust without the aid of any other propulsion system. Thus, after craft 13 is "foil borne," strut assemblies 55 are tilted a few degrees to the rear, and the resulting force includes a horizontal component which propels craft 13 forward. Although the magnitude of this thrust vector is not large, it should be remembered that the total drag for the craft is extremely small, and, therefore, operational speed is maintained. To illustrate this surprising result, calculations show that if spray resistance is ignored and the surface of the strut is treated as being smooth, the friction drag coefficient will have a value of 0.005, as based on plan form area. This coefficient value makes the frictional resistance per foil at 40 knots equal to 48.5 pounds. The required angle of tilt of strut assemblies 55 to develop this amount of thrust is 1.4°. Work done by the resulting thrust is at the rate of 5.96 horsepower per strut. Thus, the power required per craft to overcome the foregoing frictional resistance of the struts (4 per craft) and the wave-making resistance is only 24.7 horsepower. Thus the ratio of life to drag of the struts alone, exclusive of spray drag, is 39.0.

An alternate way of steering craft 13 is to vary the thrust produced by strut assemblies 55 in the manner described above so that one side of the craft develops a greater thrust of the strut assemblies on the other side of the craft. The difference in thrust between the two sides of the craft develops a moment action to rotate the craft about an axis of yaw. Fins 38 serve to prevent excess roll when craft 13 is in a turn in the manner described above. However, in tight turns, means may be provided for relatively increasing the pressure in strut assemblies 55 which are on the outer side of craft 13 during the turn. Fins 38 provide the damped spring constant during and after the turn so that the craft stability is maintained.

In operation, with strut assemblies 55 in their retracted vertical position, hull 30 rides in the water and is propelled by conventional propeller 14. Assemblies 55 are then rotated to their vertical downward position, pump 60 is energized, and propeller 14 increases the forward speed of craft 13. When the forward speed and strut pressure become sufficient, struts 50 develop enough lift to carry hull 30 out and over the water in the manner described above. When a predetermined operational speed is reached, strut assemblies 55 are tilted slightly to the rear to develop thrust, and propeller 14 can be de-energized or taken from the water. Thrust developed by strut assemblies 55 accelerates craft 13 until equilibrium is reached with the drag forces encountered.

Once craft 13 is "foil borne," equilibrium is established between the weight of craft 13 and the weight of domes 22 that form in the manner set forth above. Thereafter, the lift developed by assemblies 55 is independent of craft speed and is only dependent on the pressure maintained by pump 60.

The rate of flow of water from openings at the bottom 56 of struts 50 is related to the total resistance of the craft times the craft speed. The required horsepower and the effective horsepower are very nearly equal because the efficiency of propulsion in the present example of 20 knots is about 99 percent.

At 40 knots, wave-making resistance is unimportant, being only about 1.69 pounds per strut in the example considered. However, at 15 knots, wave-making resistance is important, being 13.77 pounds per strut for the present example. The frictional resistance at 40 knots is, for smooth surface, 48.5 pounds per foil, but for 15 knots, it is calculated as being only 6.8 pounds per foil.

Figure 7:
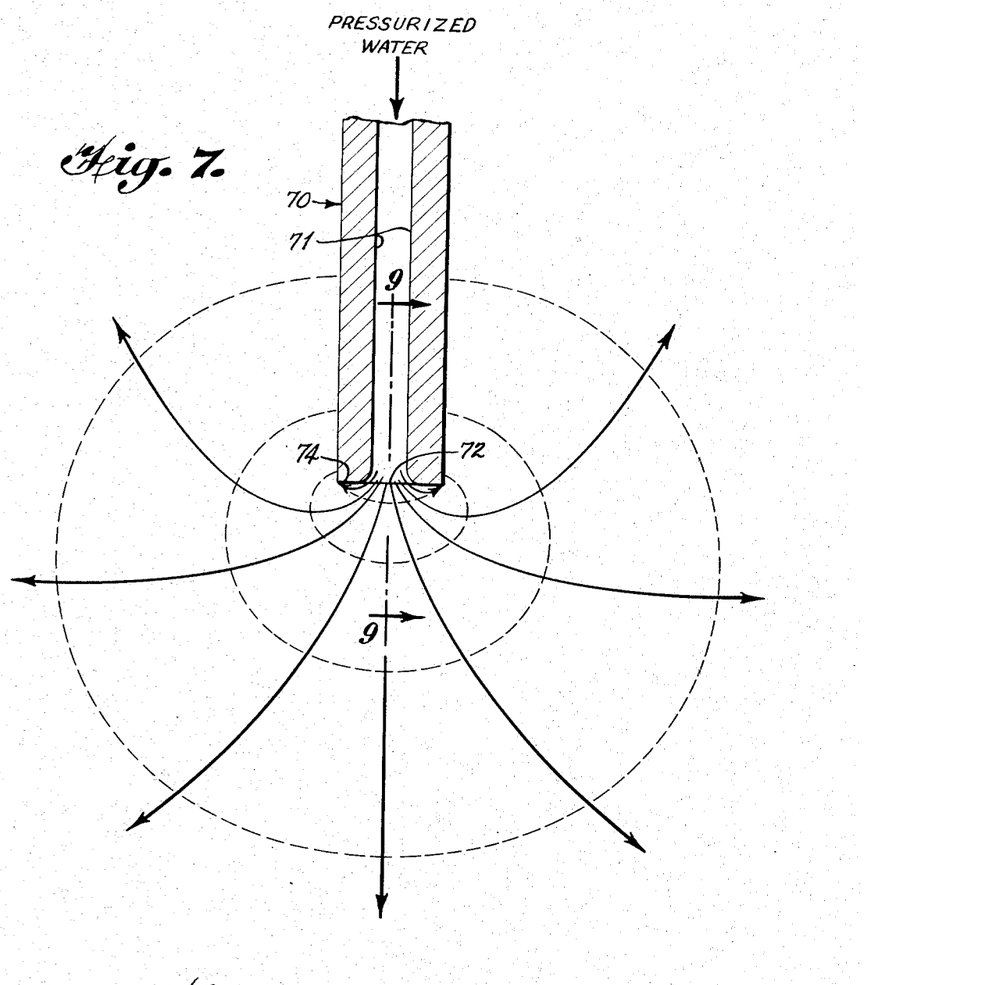
FIG. 7 is a vertical transverse sectional view of the base portion of yet another strut in accordance with the present invention, along with a schematic illustration of the local pressure distribution created by the strut.
Figure 8:
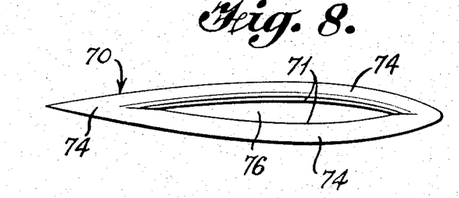
FIG. 8 is a bottom plan view of the strut of FIG. 7.
Figure 9:
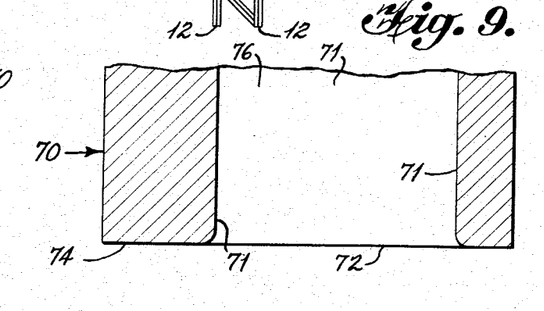
FIG. 9 is a vertical longitudinal sectional view taken along lines 9—9 of FIG. 7.
Figure 10:
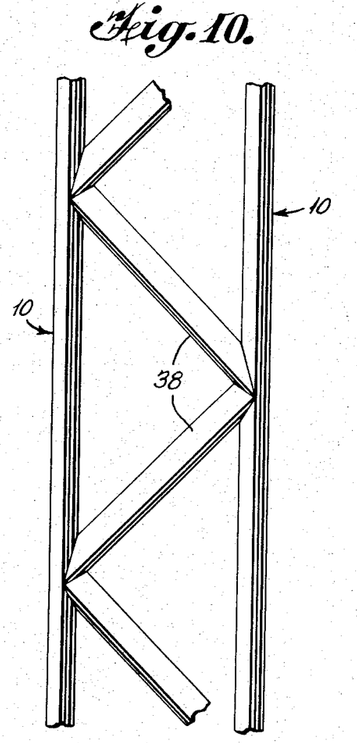
FIG. 10 is a front elevation of a fragment of a strut assembly with connecting fins in accordance with the present invention.
Figure 11:
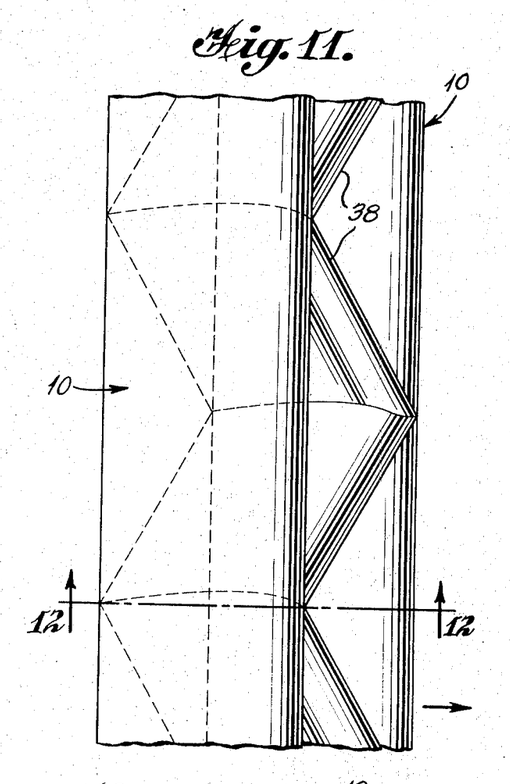
FIG. 11 is a side elevation of the strut assembly shown in FIG. 10 looking inboard as more fully described below.
Figures 12, 13:
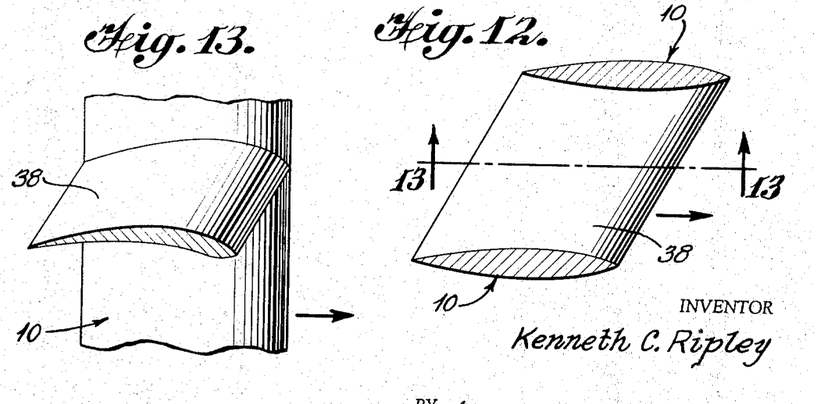
FIG. 12 is a horizontal cross section of the strut taken along line 12—12 of FIG. 11.
FIG. 13 is a vertical longitudinal cross section, taken along line 13—13 of FIG. 12.

A speed of 15 knots may be desired for possible take-off speed and as a possible choice of crusing speed where transport efficiency and range is a matter of primary concern. The embodiment of the present invention shown in FIGS. 7–9 operates with low wave-making resistance and, thus, is preferably used when the craft is expected to operate at 15 knots. Strut 70 of this embodiment is characterized by having inner walls 71 which are vertical down to the bottom 72 of foil 70. However, walls 71 have a small, rounded edge so as not to present abrupt changes in the flow pattern. This bottom 72 has flat portions 74 about the single conduit 76 which extends through strut 70 and communicates with the ambient through bottom 72.

The effect of the flat base area 74 about the opening of conduit 76 is that a portion of the pressure developed under base 72 results in a lifting force exerted on surface 74 and, thus, transmitted to the craft. In the absence of surface 74, the high pressure under strut 70 would merely tend to increase the size of dome 22 and, thus, not contribute to the effectiveness of strut 70. Lift is also developed by the liquid in conduit 76 in the same manner as that for the liquid in conduit 52 of FIG. 4. It should be remembered that operating craft 13 at slower speeds results in greater wave-making drag so that an unnecessarily large volume of liquid exhausts at bottoms of foils 50. But this phenomenon is now partially offset by the reduced cross-sectional area of a conduit opening at the bottom 72 of foil 50 of FIG. 7. If necessary, operating pressure in conduit 76 can be increased.

Another strut design according to the present invention is shown in FIG. 16. Foil 80 has a number of conduits 82 which have their upper ends communicating with reserve pressure tank 59 and pump 60 and their lower ends communicating with the large space 84 defined by the walls 86 at the base of strut 80. The forward edge of strut 80 has a number of water inlet ports 88 which communicate with the liquid supply channel 90. Supply channel 90 also extends the height of strut 80 and leads to appropriate supply conduits (not shown) to pump 60. It is apparent that the forward velocity of strut 80 enhances the liquid supply up through supply channel 90 to pump 60. In FIG. 14, depending liquid intake strut 64 is not used when strut 80 is used in one or more of strut assemblies 55.

As mentioned above, craft 13 can operate on the high seas and in unsheltered waters. Each of the pressurized struts described herein creates a submerged point source of loading of the water through a sphere-like radiation of pressure from the base thereof. At the base, the pressure is so high that the stagnation pressure of wave energies is quite insignificant for local penetration of this high-pressure region. Therefore, lift developed by the pressurized strut is not affected by motions of the sea. Therefore, craft 13 is quite insensitive to wave action so long as a substantial portion of strut assemblies 55 is maintain below the water surface. Wave action will affect the amount of lift developed by fins 38, but in view of the percentage of total lift developed by these fins, and the relatively large mass and momentum of the craft, it is believed that the craft will remain substantially insensitive to waves. It is apparent that the lengths of strut assemblies 55 can be any suitable dimension so that clearance between the "foil borne" craft and the sea is maintained.

It is estimated that the total drag for the pressurized struts of the present exampled craft operating at 40 knots is 274 pounds, whereas the total drag for the same sized craft with a conventional wing-type foil (completely submerged) is 607 pounds at 40 knots. The lift-drag ratios are estimated at 28.6 and 12.9, respectively. Moreover, the present exampled craft, unlike the conventional craft, can efficiently operate at 20 knots with a total estimated drag of 84.2 pounds and a lift-drag ratio of 93.1. To operate the craft with pressurized strut, the required effective horsepower is 33.7 at 40 knots, and 5.15 at 20 knots. The required effective horsepower to operate a conventional wing-type hydrofoil craft at 40 knots is 74.6. If the pump and reserve pressure system efficiency is 0.89 for the pressurized strut craft, the required shaft horsepower is 37.8 at 40 knots, and 5.8 at 20 knots. This is compared to an efficiency of 0.45 for conventional hydrofoil craft, and at 40 knots the required shaft horsepower is 165.8.

It is estimated that the transport efficiency for the craft of the present invention is 3.70 at 40 knots and 12.1 at 20 knots. Therefore, ranges of 1,000 and 3,000 nautical miles are within the capabilities of the craft of the present invention.

It should be understood that the embodiments herein disclosed are by way of example only, and other further modifications can be made to the present invention without departing from the spirit and scope thereof.

It is here mentioned that reference is made throughout this disclosure to amounts and magnitudes of various parameters, and it should be understood that these figures are in no way a limitation of the invention but are instead illustrative of the significant and remarkable performance characteristics the present invention has in relation to known hydrofoil systems.

Moreover, the present invention is not limited to the expressed theory as regards why strut lift is developed.

What is claimed is:

1. A water craft comprising a hull, a propulsion system within said hull for moving said craft forward, an elongated lift producing wingless strut, members mounting said strut to said hull in a downward extending position and said strut being streamlined generally in the forward direction, said strut having a lower end and means for developing a significant positive static hydraulic lift producing pressure under said lower end when said hull is above the water and said strut is moving through water with said lower end entirely below the surface.

2. A water craft as set forth in claim 1, wherein a plurality of such struts is so mounted to said hull, said struts imparting to said craft over one-half the vertical force necessary to lift said hull above the water surface.

3. A water craft as set forth in claim 1, wherein said developing means comprises a positive pressure cambered surface at the bottom of said strut having an area slightly larger than the cross-sectional area of said lower end.

4. A water craft comprising a hull, a propulsion system within said hull for moving said craft forward, an elognated lift producing wingless strut, members mounting said wingless strut to said hull in a downward extending position, said strut having a forward edge and a rear edge generally aligned in a forward direction, the lower end of said wingless strut having a positive cambered bottom surface, and said wingless strut having a thickness-to-chord ratio less than one and having a portion above said cambered surface which is symmetrical about the chord.

5. A water craft as set forth in claim 4, wherein said mounting members are adjustable to selectively change the angular position in a generally forward vertical plane which said strut makes with the vertical so that the angle of attack of said cambered surface is adjustable.

6. A water craft as set forth in claim 4, wherein said strut is solid.

7. A water craft as set forth in claim 1, wherein an elongated conduit is provided in said wingless strut and which has one end communicating with the ambient through the bottom thereof, said developing means comprising a pressure system carried by the craft for feeding liquid with positive pressure to the upper end of said conduit so that it exhausts the bottom thereof to the ambient.

8. A water craft as set forth in claim 7, wherein the wingless strut has a base with inner walls defining a chamber, said lower conduit end communicating with the top of said chamber, and the bottom of said chamber being open to the ambient.

9. A water craft as set forth in claim 7, wherein the lower end of said strut has inner walls forming a chamber, the lower end of said conduit opening into said chamber, said walls being inclined toward the outer surface of said lower end as they approach the bottom of said strut.

10. A water craft as set forth in claim 9, wherein at least two such conduits are provided in said strut, each with its upper end fed by said pressure system and its lower end opening into said chamber.

11. A water craft as set forth in claim 7, wherein the bottom of said strut includes a horizontal surface.

12. A water craft as set forth in claim 7, wherein said pressure system comprises a pump, a liquid intake connected to said pump to deliver liquid from the ambient to said pump, and pressure lines to feed high-pressure liquid from said pump to said upper end of said strut conduit.

13. A water craft as set forth in claim 12, wherein said intake comprises intake ports at the forward edge of said strut which feed an intake chanel which extends up said strut.

14. A water craft as set forth in claim 12, wherein said intake comprises an elongated streamlined member mounted to said hull in a downward position and having a lower end below the water surface when said hull is above the water surface, said streamlined member having intake ports at its forward edge of its lower end and an intake channel communicating with said ports extending up said streamline member.

15. A water craft as set forth in claim 12, wherein a pressure casing is connected in liquid series from the pump discharge to said pressure lines, said casing at least partially filling with pressurized liquid when said pump is operating, and a restriction defining a nozzle located in the discharge of said casing to present a high velocity escape of liquid therefrom.

16. A water craft as set forth in claim 15, further coming a reserve pressure tank having an opening communicating with said casing below the liquid level therein and normally having a body of liquid partially filling the same, the capacity of said tank being greater than the capacity of said casing, and an additional restriction provided to prevent high velocity discharge from said tank.

17. A water craft as set forth in claim 7, wherein said members are adjustable to selectively change the angular position in the vertical forward plane that said strut makes with the vertical.

18. A water craft as set forth in claim 1, comprises a strut assembly mounted to said hull and extending into the water when the hull is above the water surface for damping heave, roll and pitch motions.

19. A water craft as set forth in claim 18, wherein said assembly includes a plurality of upwardly spaced fins supported by said strut and each shaped to produce lift as it moves through water, whereby the lift developed at any instant by said plurality of fins depends in part upon the number of submerged fins.

20. A water craft as set forth in claim 19, wherein a pair of parallel struts is provided, one of said struts being more inboard than the other, and said fins having their ends connected to opposite struts.

21. A water craft as set forth in claim 20, wherein the spans of said fins are arranged at an angle to the horizontal.

22. A water craft as set forth in claim 21, wherein said inboard strut is arranged ahead of the other strut.

23. A water craft as set forth in claim 1, wherein said strut has a thickness-to-chord ratio of less than one, said said members being rotatable in a horizontal plane to selectively vary the horizontal angle of attack of said strut, and a steering mechanism being provided to control the member rotation.

24. A water craft as set forth in claim 23, wherein said rotatable member is mounted to the aft section of the hull.

25. A water craft as set forth in claim 1, wherein said members are rotatable in a vertical, transverse plane to retract said strut when the craft is hull borne by moving said strut to an upward position.

26. A water craft comprising a hull, a propulsion system within said hull for moving said craft forward, a plurality of elongated lift producing wingless struts, members mounting each of said struts to said hull in a downward extending position, each strut being streamlined and having a leading edge and a trailing edge, said edges being generally aligned in the forward direction, said strut having a lower end which is symmetrical about the chord drawn between said leading and trailing edges and having a thickness-to-chord ratio less than one, said lower end having a bottom comprising a positive cambered surface the edges which terminate at the upward extending outer surface of said lower end and which is entirely below the water surface when the hull is above the water surface, said members including brackets, a pair of each said foils having their upper ends secured to said brackets, one strut of said pair being spaced outboard and behind the other, a plurality of vertically spaced fins having their spans disposed at an angle with the horizontal being mounted between each pair of said struts, the leading edge of each said fin being aligned between the leading edges of said pair of said struts, each of said plurality of fins being shaped to produce lift when moving through water and said plurality of fins extending from said lower end upward to a location above the water line when said hull is above the water surface.

27. A water craft comprising a hull, a propulsion system within said hull for moving said craft forward, a plurality of elongated lift producing wingless struts, members mounting each of said struts to said hull in a downward extending position, each strut being streamlined and having a leading edge and a trailing edge, said edges being generally aligned in the forward direction, said strut having a lower end which is symmetrical about a cord between said leading and trailing edges and having a thickness-to-chord ratio less than one, an elongated conduit provided in each of said struts with its lower end opening through the bottom thereof entirely into the water ambient, said craft further comprising a pressure system for feeding liquid under positive pressure to the other end of each said conduit, said system having a liquid intake member extending from said hull to said water when said hull is above the water surface, said intake member having a plurality of ports located at the forward side of its lower end and communicating with an intake channel which extends up said intake member to said pressure system, said members including brackets, a pair of each said struts having their upper ends secured to said brackets, one strut of said pair being spaced outboard and behind the other, a plurality of vertically spaced fins having their spans disposed at an angle with the horizontal being mounted between each pair of said struts, the leading edge of each said fin being aligned between the leading edges of said pair of said struts, each of said plurality of fins being shaped to produce lift when moving through water, and said plurality of fins extending from said lower end of said struts upward to a location above the water line when said hull is above the water surface.

References Cited

UNITED STATES PATENTS

| | | | |
|---|---|---|---|
| 1,088,226 | 2/1914 | Hewitt | 114—66.5 |
| 1,307,135 | 6/1919 | Lake | 114—66.5 |
| 1,410,876 | 3/1922 | Bell et al. | 114—66.5 |
| 1,838,354 | 12/1931 | Bauer | 114—66.5 |
| 3,006,307 | 10/1961 | Johnson | 114—66.5 |
| 3,162,166 | 12/1964 | Handler | 114—66.5 |
| 3,223,066 | 12/1965 | Irving | 114—66.5 |

FOREIGN PATENTS 814,173   6/1959   Great Britain.

ANDREW H. FARRELL, *Primary Examiner.*